(12) United States Patent
Nystrom et al.

(10) Patent No.: US 6,540,315 B1
(45) Date of Patent: Apr. 1, 2003

(54) SYSTEMS AND METHODS FOR STITCHING OVERLAPPING SWATHS

(75) Inventors: Peter Nystrom, Webster, NY (US); Mark Cellura, Webster, NY (US); John Walsh, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/046,195

(22) Filed: Jan. 16, 2002

(51) Int. Cl.⁷ .............................................. B41J 29/38
(52) U.S. Cl. ....................................................... 347/12
(58) Field of Search ............................ 347/12, 41, 43, 347/15

(56) References Cited

U.S. PATENT DOCUMENTS 5,714,990 A * 2/1998 Courtney ..................... 347/14
6,019,454 A * 2/2000 Serra et al. .................. 347/41
6,375,307 B1 * 4/2002 Vinals et al. ................. 347/41

* cited by examiner

Primary Examiner—Judy Nguyen
Assistant Examiner—Alfred Dudding
(74) Attorney, Agent, or Firm—Oliff & Berridge, PLC

(57) ABSTRACT

System and methods for using a fluid ejection system to distribute fluid drop density of a region between at least two overlapping swaths having pixels on a receiving medium. Using the method, overlapping swaths are stitched together by distributing a fluid ejection pattern between the overlapping swaths within the overlapped region. Because small drops of fluid can be distributed within a single region, the fluid ejection pattern can be controlled and intermediate density regions can be created by distributing the fluid of drops within a region between two fluid ejector heads or between two swaths of the same fluid ejector head. The distribution can be linear or non-linear. Furthermore, overlapping swaths are stitched together by randomly varying a stitch location within the overlapped region. In this case, a stitch location is randomly varied in the slow scan direction.

14 Claims, 6 Drawing Sheets

SYSTEMS AND METHODS FOR STITCHING OVERLAPPING SWATHS

BACKGROUND OF THE INVENTION

1. Field of Invention

This invention relates to fluid ejection systems and methods.

2. Description of Related Art

Fluid ejection systems, such as ink jet printers, have at least one fluid ejector that directs droplets of fluid towards a receiving medium. Within the fluid ejector, the fluid may be contained in a plurality of channels. Energy pulses are used to expel the droplets of fluid, as required, from orifices at the ends of the channels.

A carriage-type thermal fluid ejector system is described in U.S. Pat. No. 4,638,337 ('337 Patent). The system disclosed in the '337 patent has a plurality of printheads, each with its own fluid tank cartridge, mounted on a reciprocating carriage. The channel nozzles in each fluid ejector are aligned perpendicular to the line of movement of the carriage. A swath of information is printed on a stationary receiving medium as the carriage is moved in one direction. The receiving medium is then stepped, perpendicular to the line of carriage movement, by a distance equal to the width of the printed swath. The carriage is then moved in the reverse direction to eject another swath of fluid.

In conventional systems, a stitching method is employed that stitches together a first one of the swaths and a second one of the swaths. The stitching method, at some specific point in the overlap region, ejects fluid to satisfy specific pixel densities within the overlap region in the first swath, and subsequently ejects fluid to satisfy specific pixel densities within the overlap region in the second swath.

In U.S. patent application Ser. No. 09/232,636, incorporated herein by reference in its entirety, a multi-sensor scanning system or image processing system is disclosed which includes a plurality of sensors. Each sensor scans a portion of a document to produce image data. Each of the sensors overlap adjacent sensors and the sensors thus produce overlapped image data. The image data is stitched together to form a complete image by performing a weighted averaging over the overlapped image data. The weighted averaging may be linear or non-linear.

SUMMARY OF THE INVENTION

Although the exemplary systems and methods according to this invention provide examples of stitching overlapping swaths using "fluid ejection," it should be appreciated that the systems and methods according to this invention can use any material that can be propelled onto a receiving medium or transfer media. For example, the systems and methods according to this invention can be used with a system where the fluid is derived from a solid material.

It should also be appreciated that various arrangements of multiple fluid ejectors can be used that require an overlapping architecture. While scanning carriage printers are one obvious example, larger higher productivity printing systems using multiple heads can be conceived. These architectures may have multiple heads per color or multiple many-color heads. Moreover, these heads can range from small devices to partial width arrays to large arrays for large format devices. Finally, these heads may move, but also may be fixed to the frame or sub-frame of the imaging system.

As described above, fluid ejection systems usually use a single fluid ejector that prints a corresponding number of swaths, or an array of fluid ejectors that print a swath. Thus, the fluid ejection system's productivity is limited to the size of the fluid ejectors used. During printing, while the fluid ejectors print a swath, productivity increases if the fluid ejectors move a full swath width relative to the previous swath. Thereafter, the fluid ejectors print an additional swath.

However, pattern quality of the ejected fluid when using this process is reduced as the opportunity to place fluid drops in a given location is limited to one pass of the fluid ejector. Another problem occurs in that stitch errors occur between each swath as the ejected drops in a first swath fail to align with the ejected drops in adjacent second swath. The stitch errors can occur whenever a subsequent drop ejected by the fluid ejector in one swath is displaced in any direction relative to the position that such a drop should occupy on the receiving medium relative to a previous drop ejected by the fluid ejector in the adjacent swath.

One technique for dealing with this problem is to overlap adjacent swaths. However, overlapping the swaths increases the number of mechanical stitching defects created on the receiving medium, and, in addition, oversized overlaps can also negatively impact productivity. This problem is especially present when multiple fluid ejectors for a single fluid are placed on a single carriage or otherwise are used together in a single fluid ejection system. These multiple fluid ejectors can be staggered on the carriage or arranged in a line.

This invention provides systems and methods that mask the stitching defects created between overlapping swaths.

This invention separately provides systems and methods that improve the quality of an image on a receiving medium by reducing stitching defects in missing printed data.

This invention separately provides systems and methods that improve the quality of an image on a receiving medium by reducing the defects in image data that occurs at a point in the image where the brightness and/or gray level rapidly changes.

This invention separately provides systems and methods that eject a successively smaller amount of fluid on the last few lines of a first swath of a receiving medium, while subsequently ejecting a successively larger amount of fluid on the first few lines of an adjacent swath.

The invention provides systems and methods that, during a first swath, eject fluid for only a first portion of pixels, in an overlapping region, while a second portion of pixels is skipped over, and that, during an adjacent second swath eject fluid for only the second portion of pixels, while the first portion of pixels is skipped over.

In various exemplary embodiments of the fluid ejection system and methods according to this invention, overlapping swaths are stitched together by distributing the fluid ejection pattern between the overlapping swaths within the overlapped region.

In various exemplary embodiments, the fluid ejection system uses fluid ejectors that allow the size or number of drops ejected for each image pixel to be closely controlled. In these systems, because the amount of fluid can be controlled, the amount of fluid within each pixel of an overlapping region can be distributed between the two overlapping swaths. That is, the fluid ejection pattern can be controlled and intermediate density regions can be created by distributing the amount of fluid within a region between two fluid ejector heads or between two swaths generated by the same fluid ejector head. The distribution can be linear or non-linear.

In various other exemplary embodiments of the fluid ejection system and methods according to this invention, overlapping swaths are stitched together by randomly or pseudo-randomly varying a stitch location within the overlapped region between two overlapping fluid ejector heads or between two swaths generated by the same fluid ejector head. In this case, a stitch location is randomly or pseudo-randomly varied in the slow scan direction.

These and other features and advantages of this invention are described in or are apparent from the detailed description of various exemplary embodiments of the systems and methods according to this invention.

BRIEF DESCRIPTION OF THE DRAWINGS

Various exemplary embodiments of this invention will be described in detail with reference to the following figures, wherein like numerals represent like elements, and wherein.

DETAILED DESCRIPTION OF EXEMPLARY EMBODIMENTS

Figure 1:
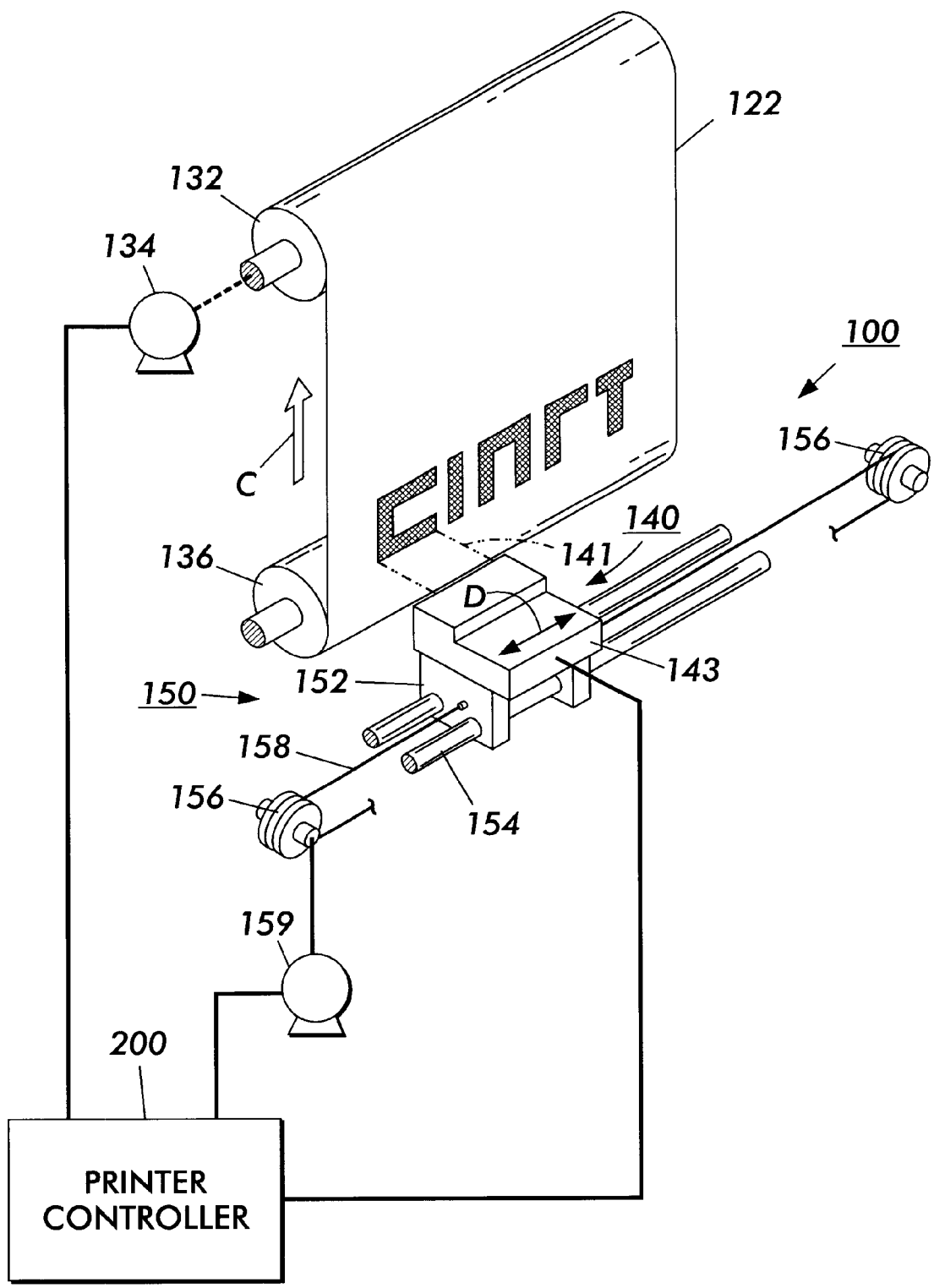
FIG. 1 is a schematic view of a first exemplary embodiment of a printing system usable with the systems and methods according to this invention.
Figure 2:
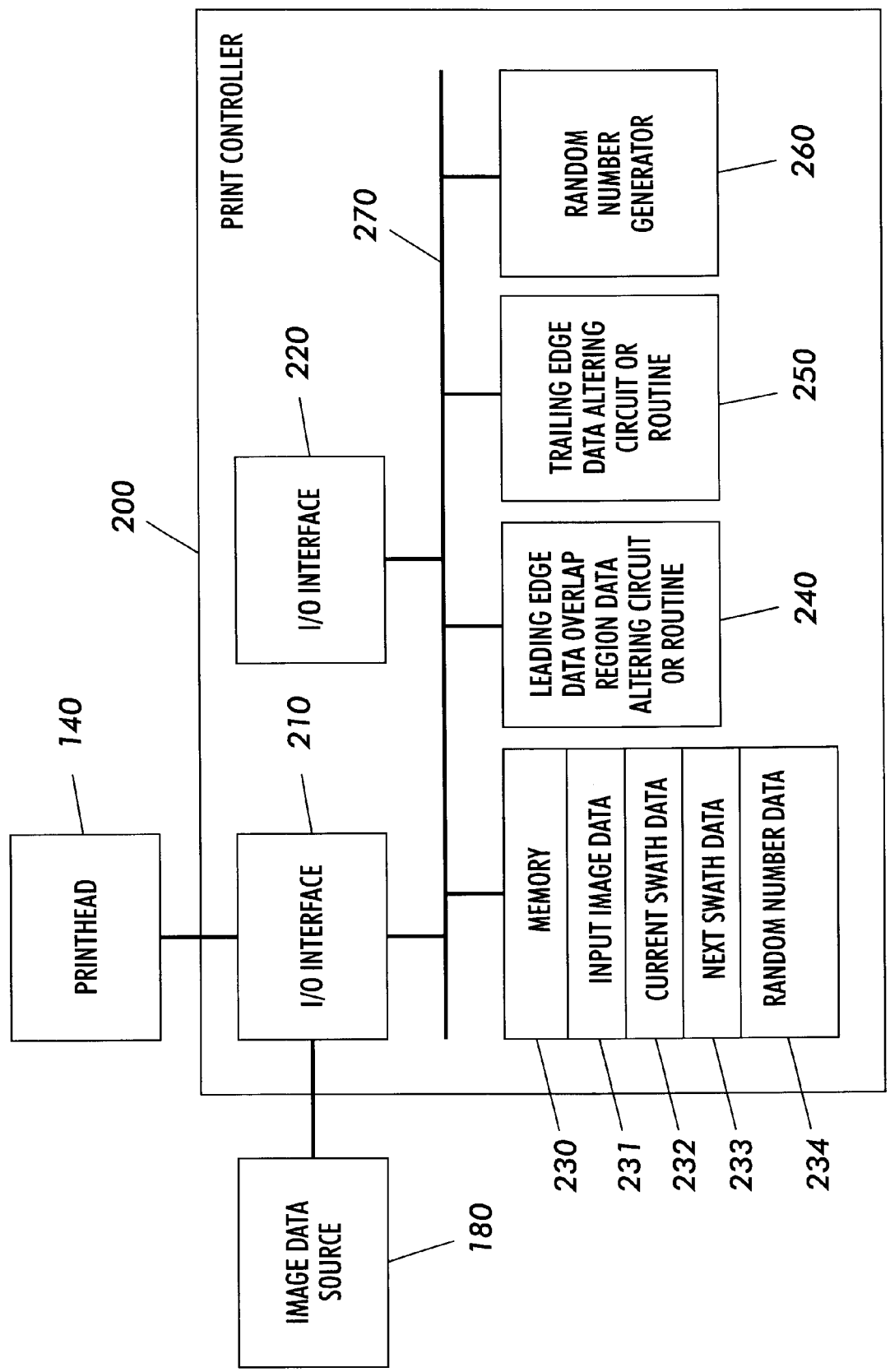
FIG. 2 is a block diagram of one exemplary embodiment of the print controller used in accordance with the printing system of FIG. 1.

For simplicity and clarification, the operating principles and design factors of various exemplary embodiments of the systems and methods according to this invention are explained with reference to one exemplary embodiment of a carriage-type ink jet printer 100, as shown in FIG. 1, and one exemplary embodiment of a printhead 140, as shown in FIG. 2. The basic explanation of the operation of the ink jet printer 100 and the printhead 140 is applicable for the understanding and design of any fluid ejection system that incorporates this invention. Although the systems and method of this invention are described in conjunction with the ink jet printer 100 and the printhead 140, the systems and methods according to this invention can be used with any other known or later-developed fluid ejection system.

FIG. 1 is a schematic view of one type of ink jet printer 100 usable with the stitching systems and methods according to this invention. As shown in FIG. 1, a carriage-type ink jet printer 100 has a linear array of droplet-producing channels housed in a printhead 140 mounted on a reciprocal carriage assembly 143. The array extends along a process direction C. The printhead 140 includes one or more arrays of ink ejecting channels and corresponding nozzles. Ink droplets 141 are propelled onto a receiving medium 122, such as a sheet of paper, that is stepped a predetermined distance by a motor 134 in the process direction C each time the printhead 140 traverses across the receiving medium 122 along the swath axis, or fast scan direction, D. Depending on the design of the printhead 140, this predetermined distance is less than or equal to the size of the array. The receiving medium 122 can be either cut sheets or a continuous sheet. If the receiving medium 122 is a continuous sheet, it can be stored on a supply roll 136 and stepped onto takeup roll 132 by the stepper motor 134. Alternatively, the receiving medium 122 can be stored in and/or advanced using any other known or later-developed structures, apparatuses or devices.

The printhead 140 is mounted on a support base 152, which reciprocally moves along the swath axis D using any known or later-developed apparatus or device, such as two parallel guide rails 154. A cable 158 and a pair of pulleys 156 can be used to reciprocally move the printhead 140 along the guide rails 154. One of the pulleys 156 can be powered by a reversible motor 159. The printhead 140 is generally moved across the receiving medium 122 perpendicularly to the direction the receiving medium 122 is moved by the motor 134. Of course, other structures for moving the carriage assembly 143 relative to the receiving medium 122 can be used without departing from the spirit and scope of this invention.

The ink jet printer 100 is controlled by a print controller 200. The print controller 200 transmits commands to the motors 134 and 159 and to the printhead 140 to produce a pattern of ejected fluid drops on the receiving medium 122. In particular, for an ink jet printer, this pattern forms an image on an image receiving medium 122.

FIG. 2 shows a more detailed description of one exemplary embodiment of the print controller used in accordance with the printing system of FIG. 1. In FIG. 2, the print controller 200 is connected to an image data source 180 and the printhead 140. The image data source 180 can be any known or later-developed source of image data to be used in the printing system in accordance with this invention. The print controller 200 can include an input/output interface 210, a controller 220, a memory 230, a leading edge overlap region data altering circuit or routine 240, a trailing edge data altering circuit or routine 250 and a random number generator 260. The printer controller components 210–260 are interconnected and controlled by the controller 220 through a busline 270.

Figure 4:
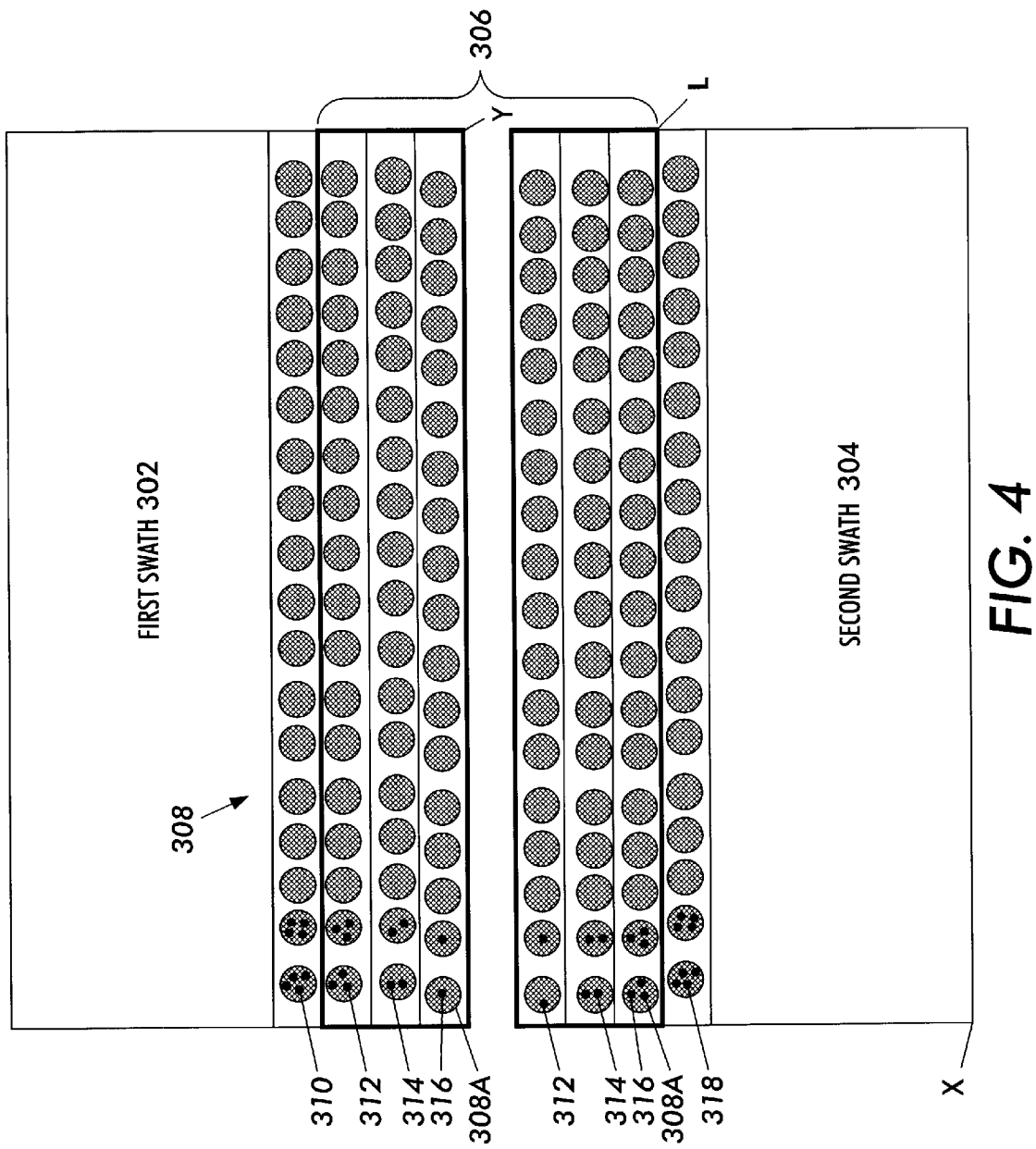
FIG. 4 is a diagram illustrating a first exemplary method for distributing the fluid amount of each pixel within an overlap region between two overlapping swaths according to this invention.
Figure 5:
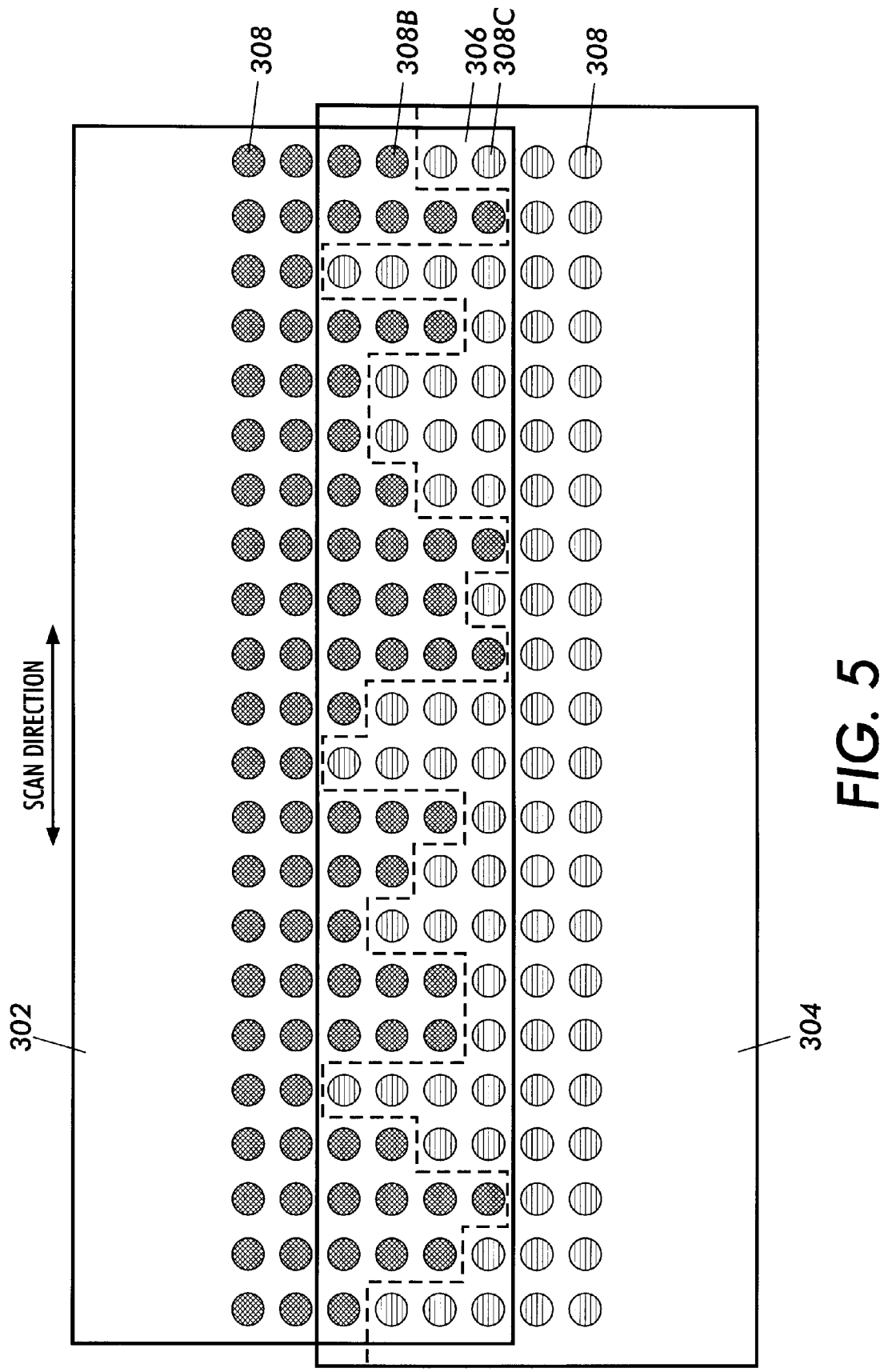
FIG. 5 is a diagram illustrating a second exemplary method for distributing the ejection locations of the overlap region between the two overlapping swaths according to this invention.
Figure 6:
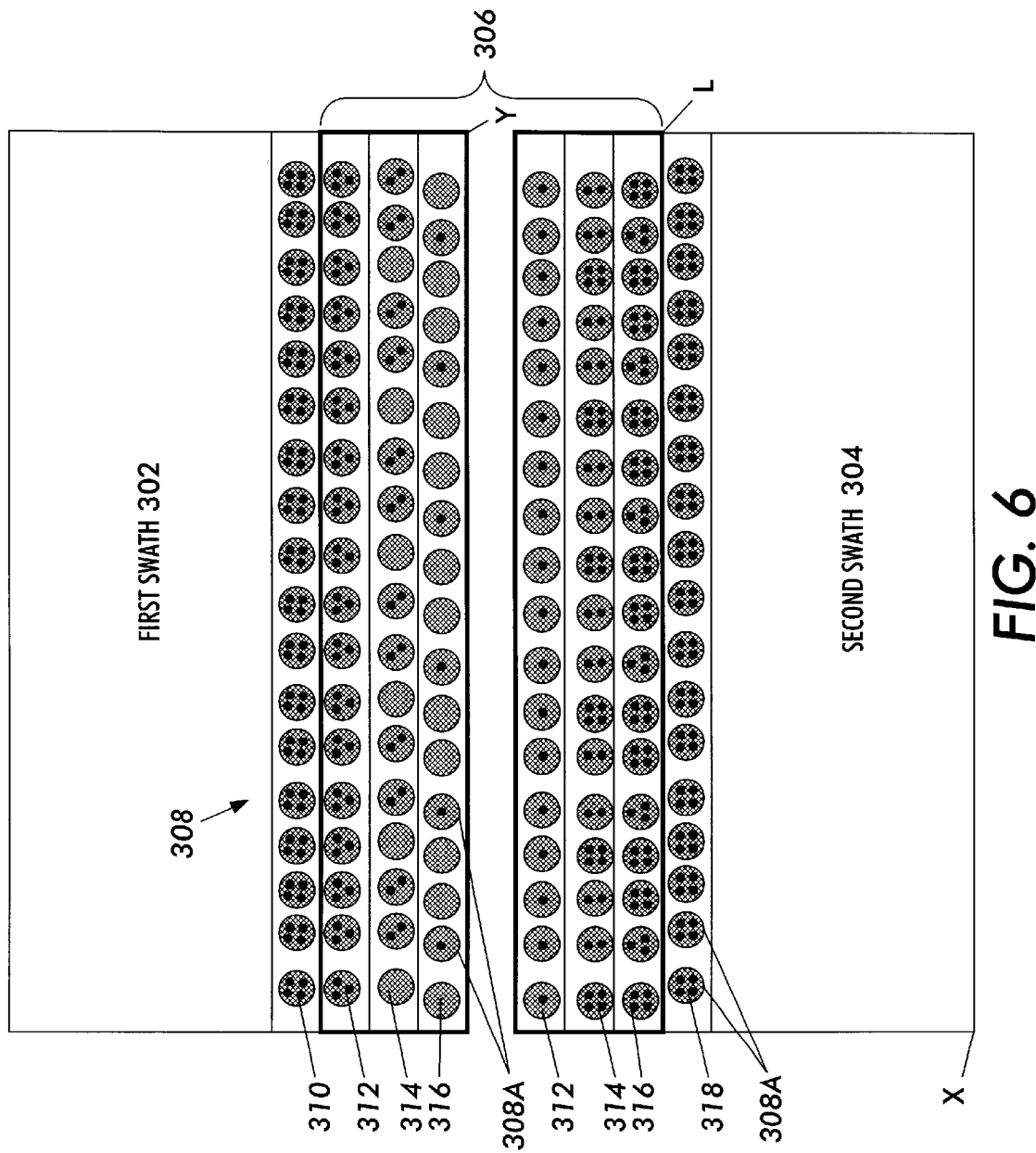
FIG. 6 is a diagram illustrating a third exemplary method for distributing the fluid amount of each pixel and distributing the ejection locations of the overlap region between the two overlapping swaths according to this invention.

The input/output interface 210 allows the print controller 200 to receive the image data from the image data source 180 and process the image data in accordance with the printing systems and methods of this invention in order to eject fluid through the printhead 140. The memory 230 stores image data for ejecting fluid on to the receiving medium. The memory 230 can include one or more of an input interface section 231, a current swath data section 232, a next swath data section 233 and a random number data section 234. The input interface section 231 stores image data input from the image data source 180. The current swath data section 232 stores current data related to, for example, the creation of a first print swath 302 or a second print swath 304 as shown in FIGS. 4–6 that will be printed by the printhead 140 and will define an overlap region 306 that will be used with the exemplary systems and methods according to this invention. The next swath data portion of the memory 230 stores the next print swath that will be printed by the printhead 140. The random number data section 234 stores random number data, or a control value, generated by the random number generator 260 that defines, for example, a specific percentage of the original density of fluid will be used to print the overlap region 306 of the print swaths. Moreover, the random number data section 234 can store a control value generated by the random number generator 260 that defines a predetermined or dynamically determined random or pseudo-random pattern of the overlap region 306 in various exemplary embodiments of the systems and methods in accordance with this invention.

The leading edge overlap region data altering circuit or routine 240 defines the leading edge region, which can be a line of pixels or a scan line, that can be created by the first print swath 302 within the overlap region 306. The leading edge overlap region can be a first region within an overlap region to have ejected fluid applied. Likewise, the trailing edge data altering circuit or routine 250 defines the trailing edge region, which can be a line of pixels or a scan line, that can be created by the second print swath 304 within the overlap region 306. The trailing edge overlap region can be the second region within an overlap region to have ejected fluid applied.

Figure 3:
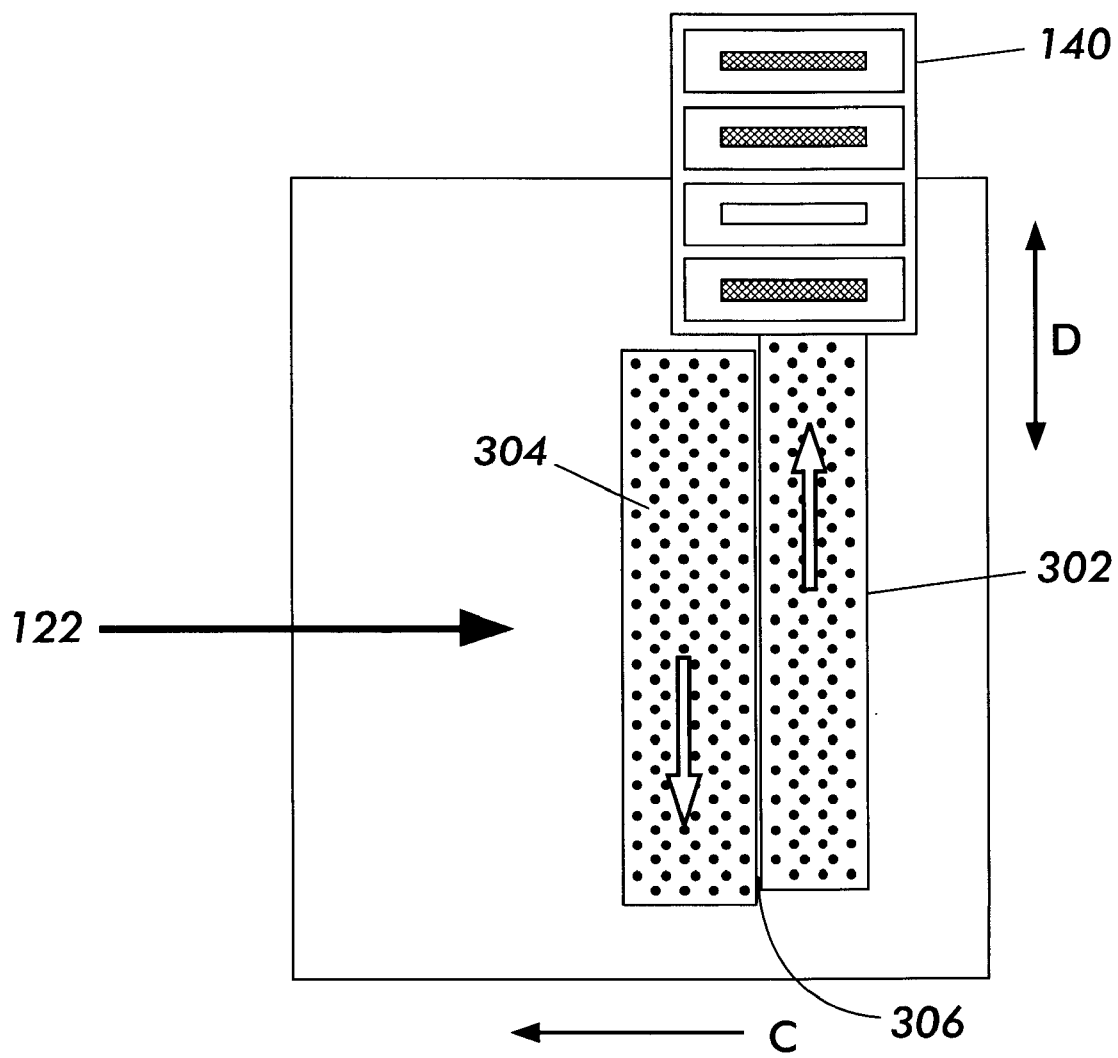
FIG. 3 is a schematic view of a pair of swaths generated by the first exemplary embodiment of the fluid ejection system usable with the systems and methods according to this invention.

FIG. 3 is a schematic view of two swaths printed by the first exemplary embodiment of the ink jet printer 100, which is usable with the systems and methods according to this invention. As shown in FIG. 3, the printhead 140 can print a first swath 302 of the fluid on the receiving medium 122 by ejecting fluid along the swath or first scan axis D as the printhead 140 travels across the receiving medium 122. Then, after moving in a direction along a process or slow scan axis C (the receiving medium typically moves in the slow scan direction), the printhead 140 can print a second swath 304 of the fluid on the receiving medium 122 by ejecting fluid as the printhead 140 travels across the receiving medium 122 along the swath axis D. By printing the first and second swaths 302 and 304 in this manner on the receiving medium 122, an overlapping region 306 is created between the first swath 302 and the second swath 304.

It should be appreciated that the printhead 140 can print a swath as the printhead 140 moves in one direction along the swath axis D, and thereafter in the opposite direction along the swath axis D. Alternatively, the printhead 140 can print a swath as the printhead 140 moves in only one direction along the swath axis D.

The larger the advance distance of the receiving medium 122, the smaller the overlap region 306 and the higher the system productivity. However, stitch errors within the overlap region 306 between the first swath 302 and the second swath 304 become more visible when the fluid ejected during the first swath 302 fails to perfectly align with the fluid ejected during the second swath 304, or where overlap or stitch region occurs at a point in the image where the brightness and/or gray level rapidly changes.

These stitch errors can cause a defect in the printed data to be formed when the printhead 140 switches from ejecting fluid for the first swath 302 to ejecting fluid for the second swath 304. As a result, the defect in the printed data can occur throughout the entire image, thus creating a visible image defect, especially if a particular defect occurs at a point in the image where the brightness or gray level is changing quickly.

FIG. 4 is a diagram illustrating a first exemplary method for distributing an amount of fluid between overlapping pixels within the overlapped region 306 between the two overlapping swaths 302 and 304 according to this invention. As shown in FIG. 4, the fluid density within the pixels on the receiving medium within the overlapped region 306 is controlled by gradually shifting, between scan lines, the number of fluid drops, or more generally, by gradually shifting the total amount of ejected fluid placed within a pixel 308 from the first swath 302 to the second swath 304. This method reduces the previously described stitch defects that are created by the fluid ejection system. As shown in FIG. 4, printing is performed on receiving medium 122 by the printhead 140 using, as an example, a predetermined or selected overlapping region 306 of the two print swaths 302 and 304. During fluid ejecting operations, the printhead 140 ejects fluid within the pixels 308 that are not in the overlapped region of the first swath 302 at 100% of the image density defined in the image print data.

In contrast, for those pixels 308a that are within the overlapped region, for each different row or scanline in the overlapped region, the printhead 140 ejects fluid at a different percentage. In various exemplary embodiments, for each of the first and second swaths, the percentage of fluid ejected within each different row or scan line increases from a lowest percentage for the row or scan line that is at the edge of the swath, through a number of intermediate percentages for rows or scanlines that are within the overlapped region, to a highest percentage that is less than, or possibly equal to 100% for the row or scanline that is at the far edge of the overlapped region from the edge of the swath. The printhead 140 accomplishes this operation by ejecting only a portion of the fluid within the defined area of each pixel 308a within the overlapped region during each swath 302 or 304.

For example, in the exemplary embodiment shown in FIG. 4, the printhead 140 ejects fluid within the overlapped region 306, which extends three pixel rows or scanlines 312–316 along the process direction C. As shown in FIG. 4, in this exemplary embodiment, during the fluid ejection of the first swath 302, the printhead 140 ejects fluid within pixels of the last row or scan line 316 of the three-line overlap region 306 at around 25% of an original determined density level for each pixel. For example, the original density of fluid required for each pixel can be predetermined for use in the ink jet printer 100 shown in FIG. 1. In FIG. 4, the density level of the ejecting fluid is represented by each dot within the pixels 308a.

At the same time, the printhead 140 ejects fluid within the pixels of the next to last row or scan line 314 of the first swath 302 at 50% of the original determined density level for each pixel. This amount of ejected fluid is represented by the two dots within the pixel in pixel line 314 in the first swath 302. Again at the same time, the printhead 140 ejects fluid within the pixels of the second to last row or scan line 312 of the first swath 302 at 75% of the original determined density level for each pixel. This amount of ejected fluid is represented by three dots within the pixel in pixel line 312. As the printhead 140 ejects fluid for the three-line overlap region 306 of the first swath 302 as outlined above, the printhead 140 simultaneously ejects fluid in the pixels 308 within the remainder of the first swath 302 at the original predetermined density level.

It should be appreciated that any original density level of fluid ejection can provide a basis for what percentage of fluid will be ejected within the overlap region 306. It should be appreciated that, for pixels having an original grayscale pixel density, reducing the original image density to about 25% may reduce the image density to zero or may be up to about 38% or more. This occurs because the number of drops printed within each pixel may not permit 25% of the image density to be printed. Likewise, for grayscale image data, the actual percentages that are about 50% and about 75% may range from about 33% or less to about 66% or more, and from about 62% or less up to 100%, respectively, in view of the actual number of dots that can be ejected for each pixel and the actual image data.

After the printhead 140 completes the first swath 302, the printer controller 200 indexes the receiving medium 122 by an amount equal to the size of the printing length Y session of the printhead 140, minus the width L of the overlapped region 306. In this example, the print controller 200 indexes the receiving medium 122 by Y–L, or the printing length Y less the width L of the three-line overlap region 306. Then, to generate second print swath 304, the printhead 140 ejects fluid within the overlap region 306 that encompasses the last three scan lines of the first swath 302 printed by the printhead 140. Thus, the total length of two swaths X is equal to twice the printing length Y minus the overlap width L, or:

$$X=2Y-L.$$

Based on the determined fluid ejection density level for each row or scanline of the overlapped region, and after the printer controller 200 has indexed the receiving medium 122, the printhead 140 now ejects fluid for the three pixel rows or scan lines 312–316 within the overlapped region 306 for the second swath 304 along the process direction C. As shown in FIG. 3, in this exemplary embodiment, during the fluid ejection for the second swath 304, the printhead 140 ejects fluid within pixels of the first scanline 312 of the three-line overlap region 306 of the second swath 304 at about 25% of the original determined density of fluid ejection for each pixel. At the same time, the printhead 140 ejects fluid within the pixels of the second scanline 314 overlapped region of the second swath 304 at about 50% of the original determined density level. Likewise, at the same time, the printhead 140 ejects fluid within the pixels of the third scanline 316 of the second swath 302 at about 75% of the original determined density level. Simultaneously, the printhead 140 ejects fluid in the pixels 308 within the remainder of the second swath 304 at the original predetermined image density level for each pixel.

As demonstrated by this example, in the first swath 302, the pixels 308a of the last three rows or scanlines of the first swath 302 are printed at successively lower relative densities. However, the pixels 308a of the first three rows or scanlines of the second swath 304 are printed at successively higher relative densities. Furthermore, it should be appreciated that, when ejecting fluid in accordance with this exemplary embodiment, any percentage of the required density for the various lines of pixels within a defined overlap region may be used without departing from the spirit and scope of the invention. Although it should be appreciated that 0 to 100% of the amount of fluid that can be constrained by an individual ejector can be considered a relative measure, various exemplary printing systems and methods according to this invention can vary the total amount of density used in different modes. A draft mode, for example, can be 50% of density, while a high quality transparency mode can be higher than a normal 100% concept of print density. Thus, in various exemplary embodiments according to this invention, a modification or reduction of the total commanded or intended density can be used, and not just the amount of fluid that can be constrained by an individual ejector.

FIG. 5 is a diagram illustrating another exemplary method for distributing the fluid ejection locations or pixels 308 within the overlap region 306 between two overlapping swaths 302 and 304 according to this invention. As shown in FIG. 5, the printhead 140 ejects a predetermined density of fluid within the pixels 308 in the first swath 302 to print the overlap region 306 of the first swath 302 and the second swath 304. However, the printhead 140 ejects the fluid of the pixels 308b of the first swath 302 located within the overlap region 306 in a randomly, or, more particularly, a pseudo-randomly, varied pattern. It should be appreciated that the randomly or pseudo-randomly varied pattern can be predetermined prior to printing and/or commencing with the fluid ejecting operations, and can include any combination of pixels 308 that are present within the overlap region 306. As shown in FIG. 5, the printhead 140 ejects fluid for the pixels 308 in accordance with the predetermined or dynamically-determined random or pseudo-random pattern to render the image and reduce the stitch defects within the overlapping region 306. Thus, it should be appreciated that the printhead 140 may not eject fluid within all of the pixels 308 within the overlap region 306 of the first swath 302. Instead, the printhead 140 ejects fluid at the defined density for each pixel for only some of the pixels 308b in the in the overlap region 306 based on the predetermined or dynamically-determined random or pseudo-random pattern.

Next, the print controller 200 indexes the receiving medium 122 so that the printhead 140 ejects fluid within the second swath 304 in accordance with the compliment of the predetermined or dynamically-determined random or pseudo-random pattern within the overlap region 306 between the first swath 302 and the second swath 304. As a result, the printhead 140 ejects fluid for the pixels 308c within the overlap region 306 for the second swath 304 that were not printed by the printhead 140 during printing of the first swath 302. The printhead 140 simultaneously ejects fluid within the remainder of the pixels 304 outside of the overlap region 306.

In this example, the fluid ejection operations conducted in this predetermined or dynamically determined random or pseudo-random pattern of the overlap region 306 demonstrates one exemplary embodiment of a varied stitch system and method in accordance with this invention. However, more improved results, i.e., improved in terms of reducing the human visual system's ability to discern the transition pattern of the stitch, are possible by using a fluid ejection pattern that appears more random. Furthermore, any random or pseudo-random pattern can be used without departing from the spirit and scope of this invention.

It should be appreciated that various exemplary systems and methods according to this invention can use a printing method where, for example, a fluid ejection density of 0% is for all practical purposes off, and a fluid ejection density of 100% is on. Using this method, the variable stitch location is then the boundary between these two values.

FIG. 6 is a diagram illustrating another exemplary method for distributing the fluid ejection locations or pixels 308 within the overlap region 306 between two overlapping swaths 302 and 304 according to this invention. This method combines the features and advantages of the exemplary embodiments shown with regard to FIGS. 4 and 5. As shown in FIG. 6, the printhead 140 ejects a percentage of a predetermined density of fluid within the pixels 308 in the first swath 302 in a randomly or pseudo-randomly varied pattern in order to print the overlap region 306 located between the first swath 302 and the second swath 304. As discussed previously, the randomly or pseudo-randomly varied pattern can be predetermined prior to printing and/or commencing with the fluid ejecting operations, and can include any combination of pixels 308 that are present within the overlap region 306. As shown in FIG. 6, the printhead 140 ejects fluid for the pixels 308 in accordance with the predetermined or dynamically-determined random or pseudo-random pattern to render the image and reduce the stitch defects within the overlapping region 306.

However, for example, while ejecting the fluid in accordance with the pattern, the printhead 140 also ejects fluid within the pixels 308a in the pattern of the last row or scan line 316 of the three-line overlap region 306 at about 25% of the original determined density level for each pixel. Thus, it should be appreciated that the printhead 140 may not eject fluid within all of the pixels 308 within the overlap region 306 of the first swath 302. Instead, the printhead 140 ejects fluid at the percentage of density for each pixel within the determined random or pseudo-random pattern for only some of the pixels 308 in the in the overlap region 306. In this particular example, the printhead 140 ejects fluid along the determined random or pseudo-random pattern in percentages of about 25%, about 50%, about 75% or about 100% of the original determined density for the first swath 302 in the overlap region 306.

Then, after indexing the receiving medium as previously described, the printhead 140 ejects fluid within the overlapping region 306 of the second swath 304 for the pixels 308 within the overlap region 306 for the second swath 304 that were not printed at 100% of the original determined density by the printhead 140 during printing of the first swath 302. For example, if the printhead 140 ejected fluid within a particular pixel in the pattern at about 25% of the original density in the first swath, then the printhead 140 would eject fluid within the same pixel in the pattern in the second swath 304 at about 75% of the original density so that the resulting pixel has about 100% of the original image density defined for that pixel. The printhead 140 simultaneously ejects fluid within the remainder of the pixels 308, if required, within the overlap region 306 of the second swath 304 to bring the density of each pixel up to about 100% of the original image density.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

The print controller 200 in various exemplary embodiments, is implemented on a programmed general purpose computer. However, the print controller 200 in accordance with this invention can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the printing methods can be used to implement the print controller 200 in accordance with this invention.

The memory 230 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

It should be understood that each of the circuits or other elements 210, 220 and 240–260 shown in FIG. 2 can be implemented as portions of a suitably programmed general purpose computer. Alternatively, each of the circuits or other elements 210, 220 and 240–260 shown in FIGS. 2 can be implemented as physically distinct hardware circuits within an ASIC, or using a FPGA, a PDL, a PLA or a PAL, or using discrete logic elements or discrete circuit elements. The particular form each of the circuits or other elements 210, 220 and 240–260 shown in FIG. 2 will take is a design choice and will be obvious and predicable to those skilled in the art.

Moreover, the print controller 200 can be implemented as software executing on a programmed general purpose computer, a special purpose computer, a microprocessor or the like. The print controller 200 can also be implemented by physically incorporating it into a software and/or hardware system, such as the hardware and software systems of a vision system.

While the invention has been described with reference to what are preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A method for ejecting fluid onto a receiving medium, comprising:

ejecting the fluid in a plurality of swaths, where each swath overlaps at least one other swath to form an overlap region for those swaths; and modifying, for the swaths defining an overlap region, fluid ejection data for pixels within that overlap region to reduce an amount of fluid ejected for each pixel within that overlap region for at least one of the overlapping swaths based on at least one of a position of that pixel within the overlap region and a control value associated with that pixel, wherein modifying the amount of fluid ejected for each pixel within the overlap region for at least one of the overlapping swaths comprises ejecting a successively smaller amount of fluid for each scanline within the overlap region of a first swath, while subsequently ejecting a successively larger amount of fluid for each scanline within the overlap region of a second swath that overlaps the first swath.

2. The method according to claim 1, wherein modifying the amount of fluid ejection data for each pixel within the overlap region for at least one of the overlapping swaths comprises:

ejecting fluid for only a first portion of pixels in the overlap region for a first swath, while a second portion of pixels in the overlap region is not printed; and ejecting fluid for only the second portion of pixels of the overlap region for a second swath that overlaps the first swath, while the first portion of pixels is not printed.

3. The method according to claim 1, wherein modifying the amount of fluid ejected for each pixel within the overlap region for at least one of the overlapping swaths comprises determining the reduced amount based on randomly or pseudo-randomly varying a stitch location within the overlap region.

4. The method according to claim 3, wherein randomly or pseudo-randomly varying the stitch location comprises randomly or pseudo-randomly varying the stitch location in a slow scan direction.

5. The method according to claim 1, wherein the control value is a percentage of an original image density of the image data for the pixels within the overlap region.

6. The method according to claim 1, wherein the control value controls a printhead to eject fluid for pixels within the overlap region of a first swath and a second swath in a randomly or pseudo-randomly varied pattern.

7. The method according to claim 1, wherein modifying the amount of fluid ejected for each pixel within the overlap region for at least one of the overlapping swaths comprises:

ejecting a successively smaller amount of fluid for each scanline within the overlap region of a first swath, while subsequently ejecting a successively larger amount of fluid for each scanline within a second swath that overlaps the first swath;

ejecting the successively smaller amount of fluid during the first swath for only a first portion of pixels in the overlap region of the first swath, while a second portion of pixels in the overlap region is not printed; and ejecting the fluid for only the second portion of pixels of the overlap region for the second swath, while ejecting successively larger amounts of fluid for the first portion.

8. A fluid ejection system that ejects fluid onto a receiving medium, comprising:

a printhead that ejects the fluid in a plurality of swaths, where each swath overlaps at least one other swath in an overlap region; and a controller that modifies, for the swaths defining an overlap region, fluid ejection data for pixels within the overlap region to reduce an amount of fluid ejected for each pixel within the overlap region for at least one of the overlapping swaths based on at least one of a position of that pixel within the overlap region and a control value associated with that pixel, wherein the controller controls the printhead to eject a successively smaller amount of fluid on pixels within a last few lines of a first swath, while subsequently ejecting a successively larger amount of fluid on pixels on a first few lines of an adjacent swath.

9. The fluid ejection system according to claim 8, wherein the controller controls the printhead to eject the fluid for only a first portion of pixels, in the overlap region for a first swath, while a second portion of pixels of the overlap region is not printed, and that, to eject fluid for only the second portion of pixels of the overlap region for a second swath that overlaps the first swath, while the first portion of pixels is not printed.

10. The fluid ejection system according to claim 8, wherein the controller controls the printhead to eject an amount of fluid for each pixel within the overlap region based on randomly or pseudo-randomly varying a stitch location within the overlap region.

11. The fluid ejection system according to claim 8, wherein the controller randomly or pseudo-randomly varies the stitch location in a slow scan direction.

12. The fluid ejection system according to claim 8, wherein the control value is a predetermined percentage of an original image density of the image data for the pixels within the overlap region of the overlapping print swaths.

13. The fluid ejection system according to claim 8, wherein the control value is at least one random or pseudo-random number.

14. The fluid ejection system according to claim 8, wherein the controller controls the printhead to eject a successively smaller amount of fluid on pixels within a last few lines of a first swath, while subsequently ejecting a successively larger amount of fluid on pixels on a first few lines of an adjacent swath, and further controls the printhead to eject fluid during a first swath for only a first portion of pixels, in the overlap region, while a second portion of pixels is skipped over, and that, during an adjacent second swath ejecting the successively larger amounts of fluid over the first portion of the pixels and ejecting the full amount of fluid over the second portion.

* * * * *